(12) United States Patent
Kim

(10) Patent No.: US 9,158,419 B2
(45) Date of Patent: Oct. 13, 2015

(54) TOUCH PANEL

(75) Inventor: Tae-Hwan Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 77 days.

(21) Appl. No.: 13/168,646

(22) Filed: Jun. 24, 2011

(65) Prior Publication Data

US 2011/0316803 A1    Dec. 29, 2011

(30) Foreign Application Priority Data

Jun. 29, 2010 (KR) .................... 10-2010-0062162

(51) Int. Cl.
*G06F 3/041* (2006.01)
*G06F 3/044* (2006.01)

(52) U.S. Cl.
CPC ...... *G06F 3/044* (2013.01); *G06F 2203/04107* (2013.01); *G06F 2203/04111* (2013.01)

(58) Field of Classification Search
None
See application file for complete search history.

(56) References Cited

U.S. PATENT DOCUMENTS

| 5,041,820 | A  | * | 8/1991  | Kazama ........................ 345/157 |
| 8,081,169 | B2 |   | 12/2011 | Lin et al. |
| 8,111,248 | B2 | * | 2/2012  | Lee et al. ........................ 345/174 |
| 8,570,288 | B2 | * | 10/2013 | Lai et al. ......................... 345/173 |
| 8,587,533 | B2 | * | 11/2013 | Nishihara et al. .............. 345/173 |
| 2003/0148196 | A1 | * | 8/2003  | Lazarev et al. .................. 430/20 |
| 2008/0264699 | A1 | * | 10/2008 | Chang et al. ................. 178/18.01 |
| 2009/0267916 | A1 | * | 10/2009 | Hotelling ....................... 345/174 |
| 2010/0134436 | A1 | * | 6/2010  | Jeong et al. .................... 345/174 |
| 2010/0182275 | A1 | * | 7/2010  | Saitou ............................ 345/174 |
| 2011/0148803 | A1 | * | 6/2011  | Xu ................................. 345/174 |

FOREIGN PATENT DOCUMENTS

| CN | 1510479 A | 7/2004 |
| CN | 1720499 A | 1/2006 |
| CN | 101673001 A | 3/2010 |

* cited by examiner

*Primary Examiner* — Nicholas Lee
*Assistant Examiner* — Duane N Taylor, Jr.
(74) *Attorney, Agent, or Firm* — Birch, Stewart, Kolasch & Birch, LLP

(57) ABSTRACT

The present invention relates to a touch panel which can detect touch securely without being affected by drive of an underlying display panel and shield external static electricity, securely, the touch panel includes a substrate having an active region and a peripheral region surrounding the active region; a plurality of first electrodes and second electrodes formed on the active region in a row direction and a column direction, respectively; a plurality of pad electrodes on one side of the peripheral region; routing lines for connecting ends of the first electrodes and the second electrodes to the pad electrodes, respectively; and a transparent conductive layer formed at the peripheral region to cover the routing lines.

12 Claims, 11 Drawing Sheets

TOUCH PANEL

CROSS REFERENCE TO RELATED APPLICATION

This application claims the priority benefit of the Korean Patent Application No. 10-2010-0062162, filed on Jun. 29, 2010 in Republic of Korea, which is hereby incorporated by reference as if fully set forth herein.

BACKGROUND OF THE DISCLOSURE

1. Field of the Disclosure

The present invention relates to touch panels, and more particularly to a touch panel which can detect a touch securely without being affected by drive of an underlying display panel and securely shield external static electricity.

2. Discussion of the Related Art

Currently, as the time turns into a full scale information oriented time, a display field in which an electric information signal is expressed in a visual sensation has been developed rapidly, and, meeting to this development, various kinds of flat display devices have been developed, which have excellent features of slimmer, lighter, and lower power consumption, to replace present cathode ray tube CRT, rapidly.

As specific examples of the flat display devices, there are the liquid crystal display device LCD, a plasma display panel device PDP, a field emission display device FED, and an electro luminescence display device ELD each of which essentially has a flat display panel in common for producing a picture. The flat display panel is provided with one pair of transparent insulating substrates bonded opposite to each other with a unique light emitting or polarizing material layer disposed therebetween.

Recently, requirements for addition of a touch panel to the liquid crystal display device are increasing for perception of a portion of the touch panel touched with a hand or additional input means and transmission of additional information matched to the touch.

Depending on touch sensing types, in the touch panels, there are a resistive type, a capacitive type, and an infrared ray sensing type, and, recently, the capacitive type is paid attention in small sized models, taking convenience of fabrication, sensing capability, and so on into account.

A related art liquid crystal display device will be described with reference to the attached drawings.

FIG. 1 illustrates a plan view of a related art touch panel, and FIGS. 2A and 2B illustrate enlarged plan views of A and B regions in FIG. 1, respectively.

Referring to FIG. 1, the related art touch panel is formed on a substrate 20 provided with an active region A/A at which touch sensing is made, and a peripheral region around the active region A/A.

Referring to FIGS. 2A and 2B, the active region A/A has a plurality of electrodes 21 formed thereon for detecting touch.

The electrodes 21 have ends having connection electrodes 30 connected thereto respectively, and each of the connection electrodes 30 has one side connected to a routing line 31 which is connected to a pad electrode 35 formed at one side of a peripheral region.

Though not shown, the pad electrodes 35 are connected to an FPC (not shown) having a touch controller which applies a signal to the pad electrodes 35.

All of the connection electrodes 30, the routing lines 31 and the pad electrodes 35 can be formed of the same material and on the same layer at the peripheral region. For an example, the connection electrodes 30, the routing lines 31 and the pad electrodes 35 can be formed of a metal having a good conductivity and a good light shielding characteristic.

Since the routing lines 31 are exposed from the substrate 20 except the pad electrodes 35 connected to the FPC and the connection electrodes 30 connected to the electrodes 21, as shown in FIG. 2B, there is no means for protecting the routing lines 31.

Consequently, at the time noise caused by external static electricity infiltrates, there is no means for shielding the noise.

And, when the touch panel is attached to a display device (not shown), such as the liquid crystal display panel, a position of the touch panel through which the routing lines 31 pass becomes to match with a circuit at the periphery of the display device, causing a problem of EMI (Electro-Magnetic Interference) taken place when the underlying display device is driven.

Thus, the related art touch panel has the following problems.

The routing lines exposed from the peripheral region of the touch panel causes noise when the external static electricity infiltrates thereto, affecting driving of the touch panel.

And, when the touch panel is attached to the liquid crystal display device, EMI interference takes place at a portion the circuit of the liquid crystal panel overlaps with the routing lines, causing malfunction of the touch.

SUMMARY OF THE DISCLOSURE

Accordingly, the present invention is directed to a touch panel.

An object of the present invention is to provide a touch panel which can detect a touch securely without being affected by drive of an underlying display panel and shield external static electricity securely.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch panel includes a substrate having an active region and a peripheral region surrounding the active region; a plurality of first electrodes and second electrodes formed on the active region in a row direction and a column direction, respectively; a plurality of pad electrodes on one side of the peripheral region; routing lines for connecting ends of the first electrodes and the second electrodes to the pad electrodes, respectively; and a transparent conductive layer formed at the peripheral region to cover the routing lines.

The transparent conductive layer is connected to the guide ring line. In this case, the transparent conductive layer has a minimum width which is equal to a straight-line distance from an inside line of innermost routing line to an outer edge line of the guide ring line.

And, the first electrodes and the second electrodes are spaced from the transparent conductive layer.

In the meantime, the transparent conductive layer is formed under the guide ring line, or over the guide ring line. In this case, the transparent conductive layer is formed in the same transparent electrodes, and on the same layer, with the first electrodes and the first electrodes.

Depending on cases, the transparent conductive layer can include a first conductive film formed under the guide ring line, and a second conductive film formed over the guide ring line. In this case, the first conductive film or the second conductive film is formed of the same transparent electrode, and on the same layer, with the first electrodes and the second electrodes, respectively.

In this instance, the guide ring line has a ground voltage or a constant voltage (DC) applied thereto.

And, the first electrode includes a plurality of first electrode patterns in one direction spaced from one another, and unitary first connection patterns each connected between adjacent first electrode patterns, and the second electrode includes a plurality of second electrode patterns in the other direction perpendicular to the first electrode patterns spaced from one another, and second connection patterns each connected between adjacent second electrode patterns from another layer. In this case, the second connection patterns can be formed on the same layer with the routing lines and the pad electrodes.

And, the touch panel can further include connection electrodes between ends of the first electrodes and the second electrodes and the routing lines, respectively. In this case, the connection electrodes are formed on the same layer with the routing lines and the pad electrodes.

And, the touch panel can further include an insulating film disposed between the routing lines and the transparent conductive layer.

In the meantime, the substrate has a surface having the first electrodes and the second electrodes formed thereon attached opposite to a surface of the display panel.

Or, the substrate is placed on and attached to the display panel. In this case, the touch panel can further include a cover glass attached to an upper surface of the substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
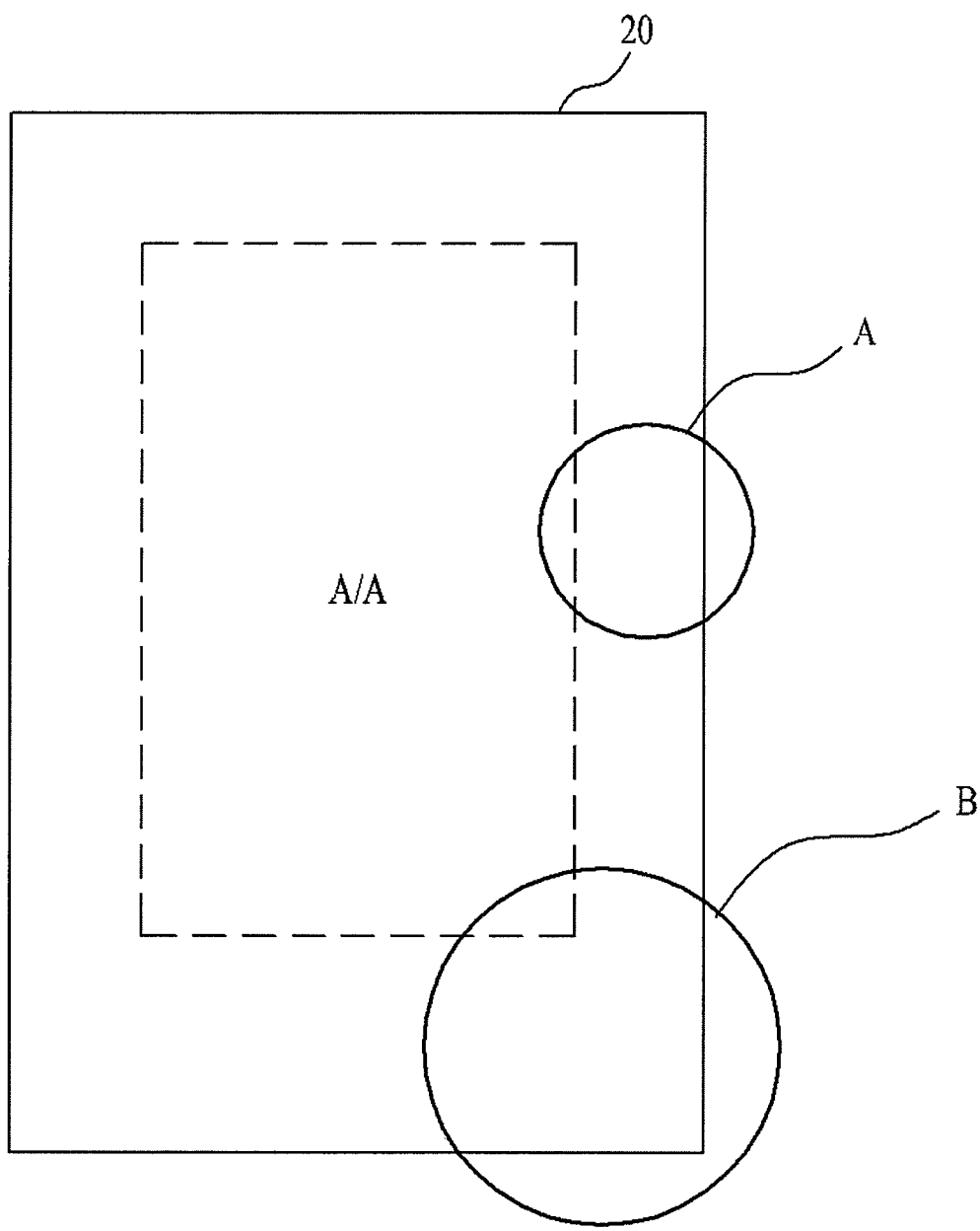
FIG. 1 illustrates a plan view of a related art touch panel.
Figure 2A:
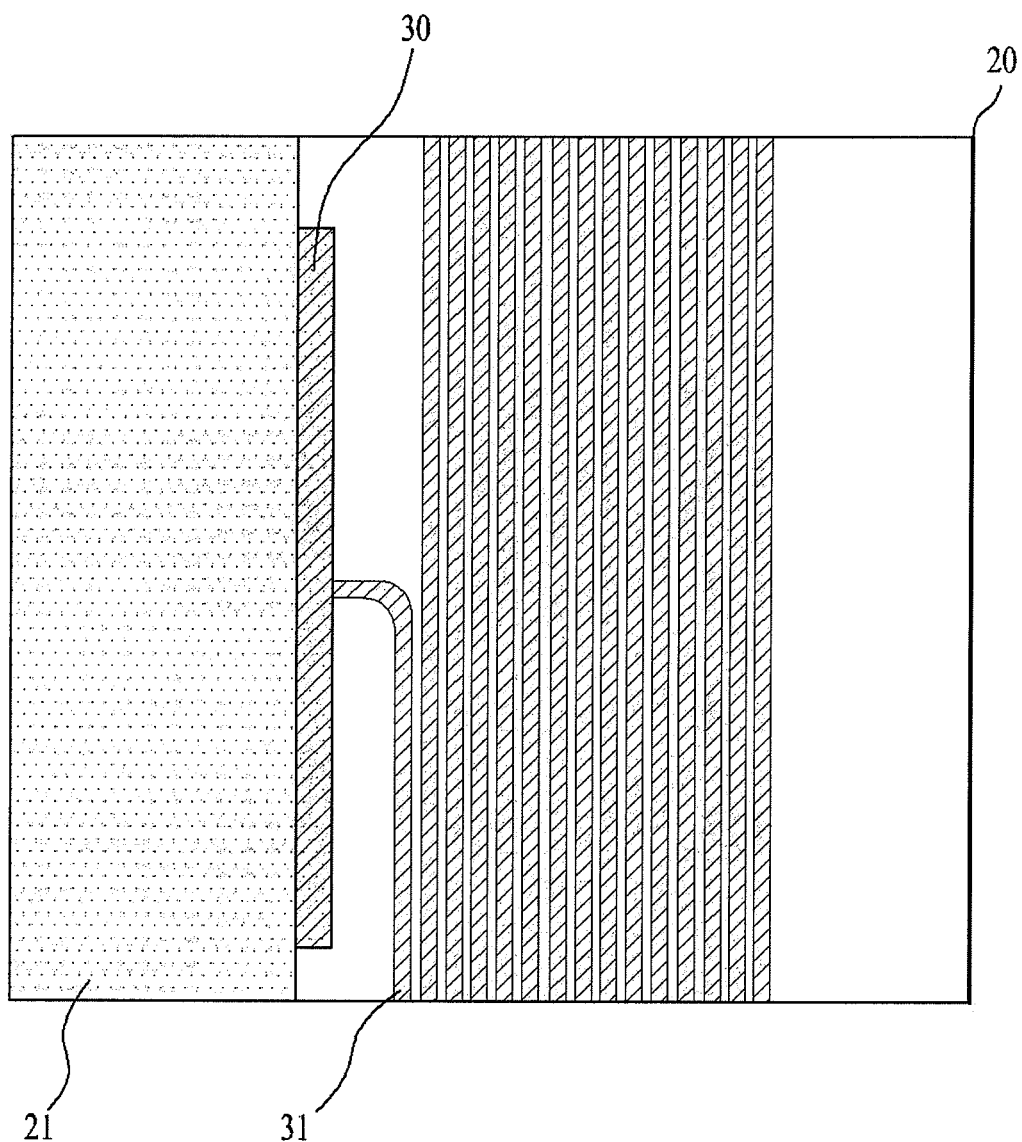
FIGS. 2A and 2B illustrate enlarged plan views of A and B regions in FIG. 1, respectively.
Figure 2B:
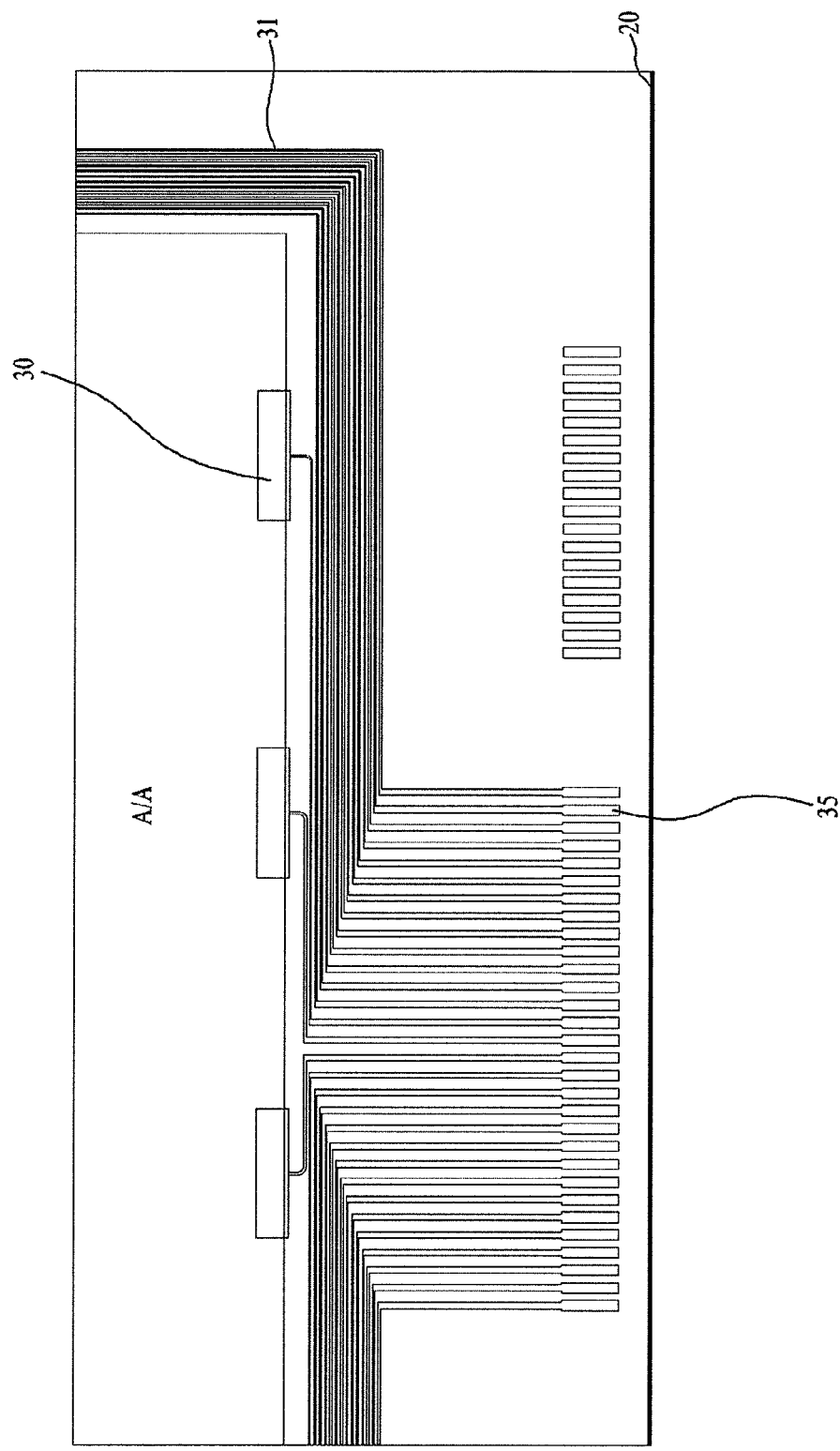
Figure 3:
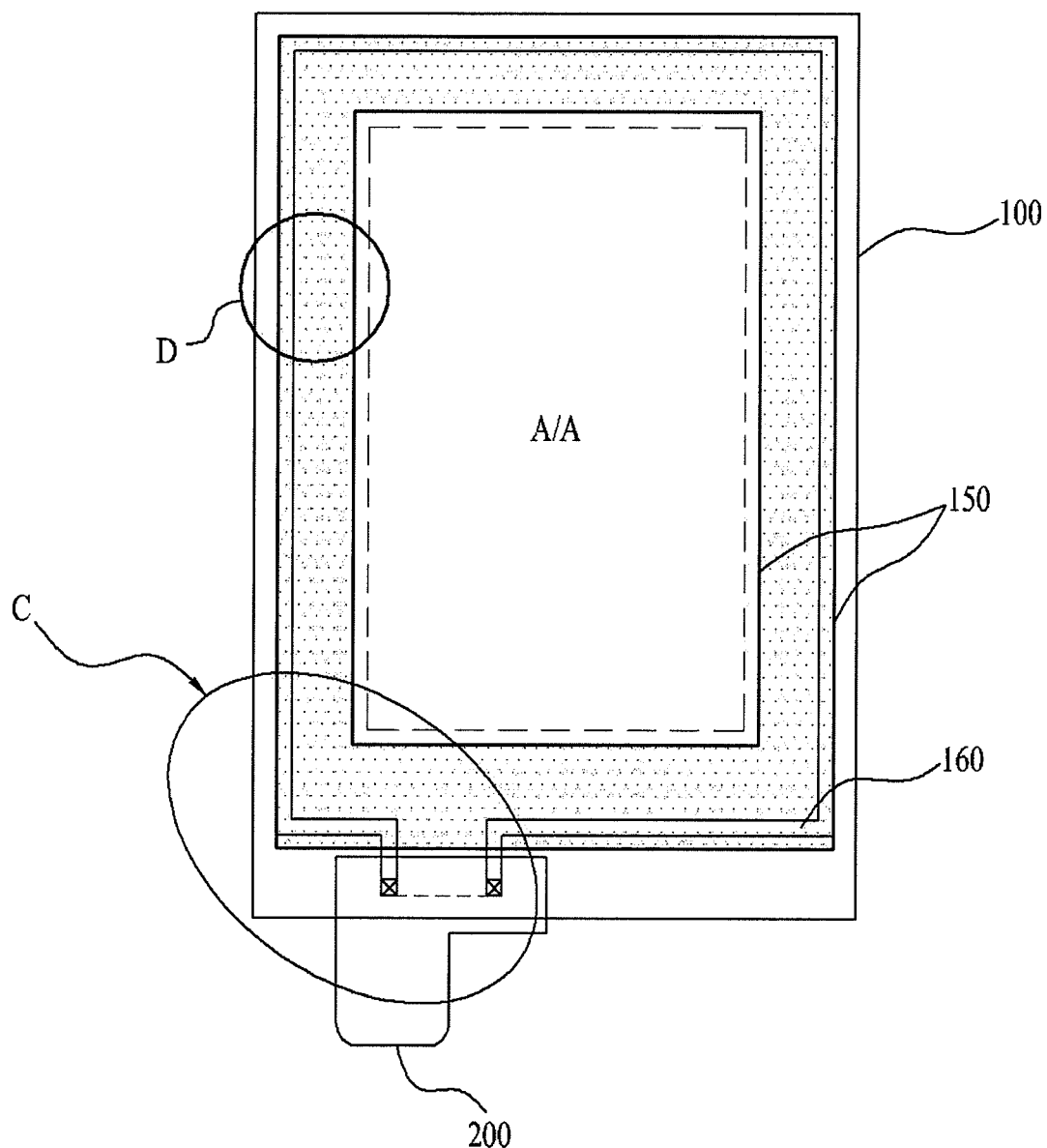
FIG. 3 illustrates a plan view of a touch panel in accordance with a preferred embodiment of the present invention.
Figure 4:
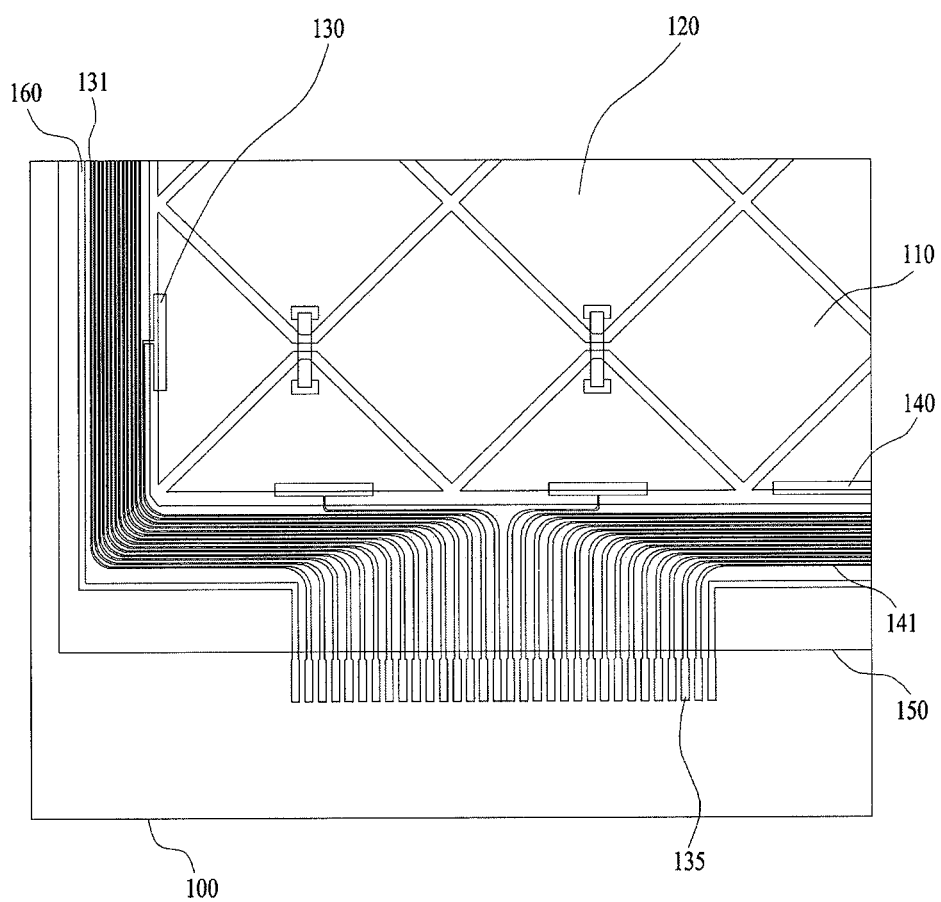
FIG. 4 illustrates an enlarge plan view of a C region in FIG. 3.
Figure 5:
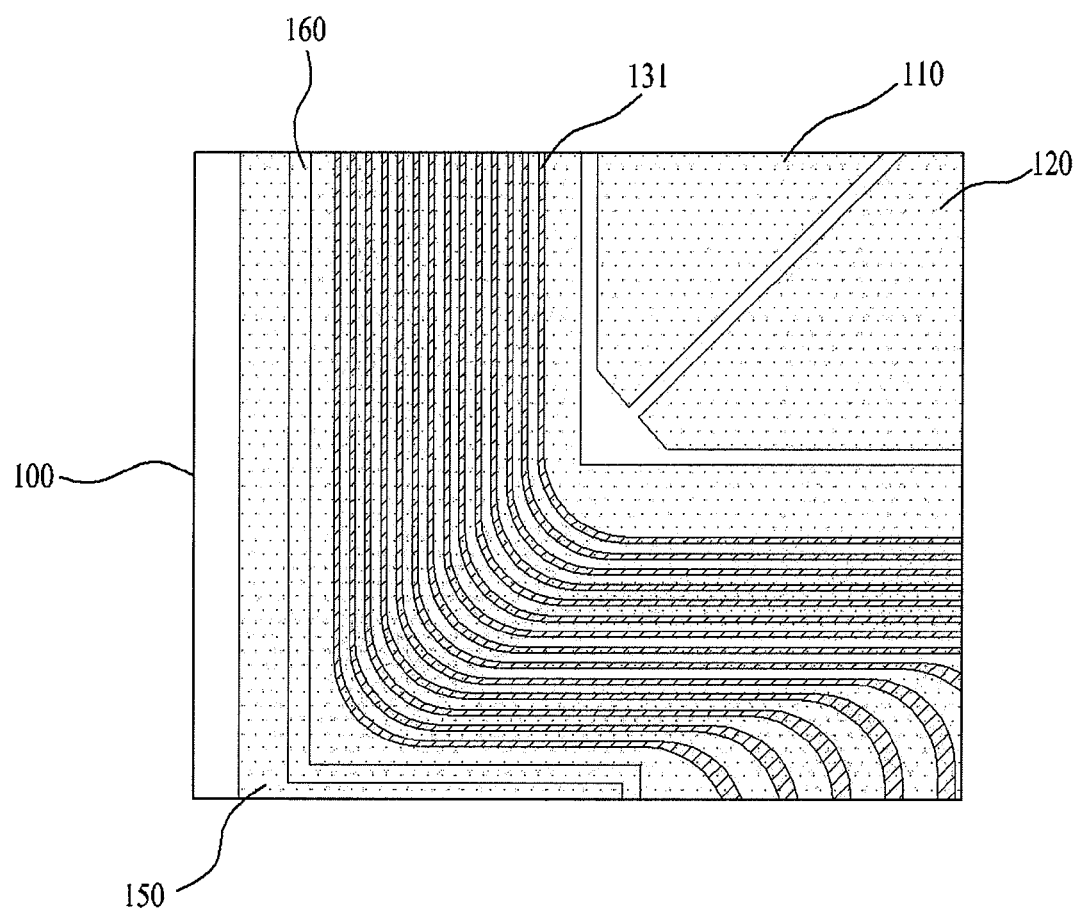
FIG. 5 illustrates an enlarge plan view of a corner of the C region in FIG. 4.
Figure 6:
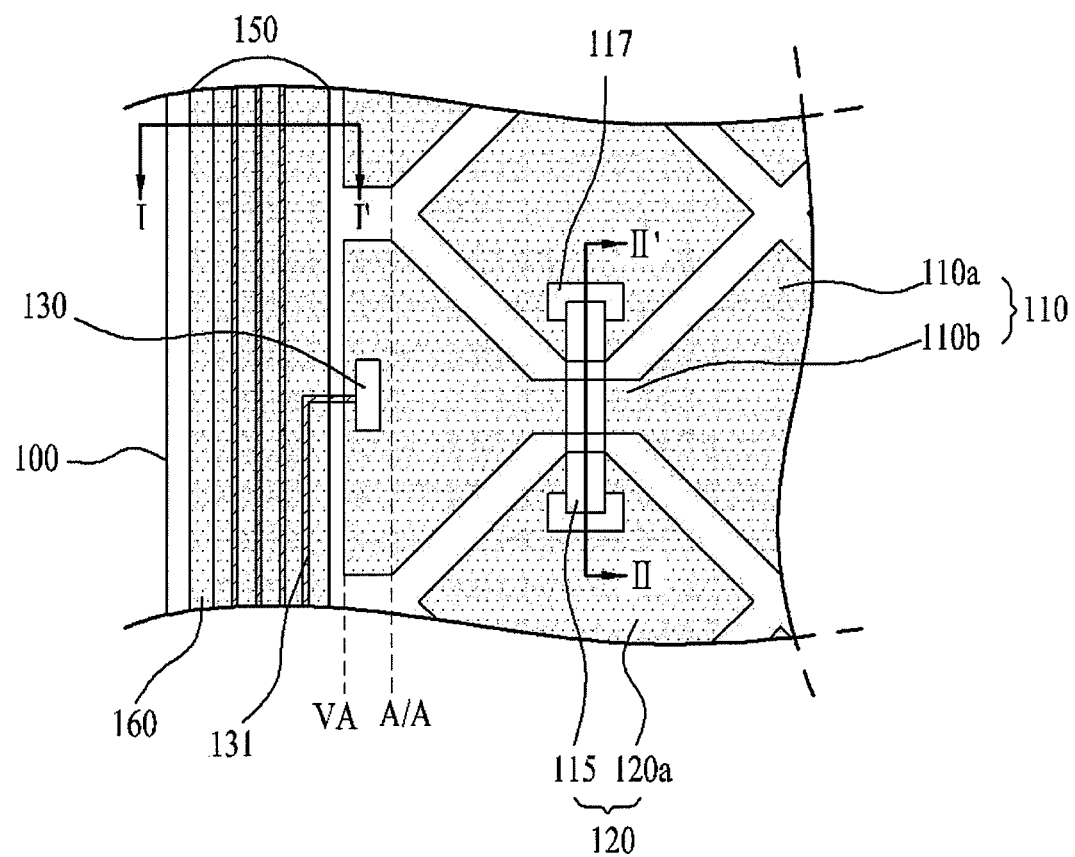
FIG. 6 illustrates an enlarge plan view of a D region in FIG. 3.

FIG. 3 illustrates a plan view of a touch panel in accordance with a preferred embodiment of the present invention, FIG. 4 illustrates an enlarge plan view of a C region in FIG. 3, FIG. 5 illustrates an enlarge plan view of a corner of the C region in FIG. 4, and FIG. 6 illustrates an enlarge plan view of a D region in FIG. 3.

Referring to FIGS. 3 to 6, the touch panel is formed on a substrate 100 divided into an active region A/A where touch sensing is made, and a peripheral region around the active region A/A.

Formed on the active region A/A, there are first electrodes 110 and second electrodes 120 perpendicular to each other in rows and columns. The first electrodes 110 are formed in a row direction (An X-axis direction) and includes a plurality of diamond shapes of first electrode patterns 110a and unitary first connection patterns 110b each connecting adjacent first electrode patterns 110a. And the second electrodes 120 includes a plurality of diamond shapes of second electrode patterns 120a in a column direction (A Y-axis direction) spaced from one another and second connection patterns 115 each connecting the Y-axis direction second electrode patterns 120a spaced from one another.

The second connection patterns 115 are formed of metal on a layer different from the first electrode patterns 110a and the second electrode patterns 120a and connected to the Y-axis direction diamond shapes of the second electrode patterns 120a through contact holes 117, for having a signal applied thereto in Y-axis direction.

And, the first electrode patterns 110a, the unitary first connection patterns 110b, and the second electrode patterns 120a are transparent electrode components formed on the same layer. The transparent electrode components are formed of ITO (Indium Tin Oxide), IZO (Indium Zinc Oxide), ITZO (Indium Tin Zinc Oxide), or ATO (Antimony Tin Oxide), so that the transparent electrode components do not impede transmission of an image from an underlying display panel.

The first electrodes 110 having the first electrode patterns 110a and the first connection patterns 110b formed in the row direction are arranged in a column direction in plural, and the second electrodes 120 having the second electrode patterns 120a and the second connection patterns 115 formed in the column direction are arranged in the row direction in plural, enabling to detect various positions of the active region.

In this instance, it is preferable that a size of each of the first electrode patterns 110a and the second electrode patterns 120a is set to be smaller than one touch region, for an example, an area of 1 cm$^2$ with a diagonal length of 1~7 mm to which one finger can touch.

At an end of each of the first electrodes 110 and the second electrodes 120, there is a connection electrode 130 or 140 formed thereon and connected to a relevant pad electrode 135 through a first routing line 131 or a second routing line 141.

And, the pad electrode 135 is connected to an FPC (Flexible Printed Circuit) for applying a relevant control signal from a touch controller in the FPC to the first electrodes 110 or the second electrodes 120.

In the meantime, the connection electrodes 130 and 140 are connected to the first electrode 110 and the second electrode 120 overlapped thereto respectively, and have one sides connected to the first and second routing lines 131 and 141, respectively. In this case, the connection electrodes 130 and 140 can be formed of metal on the same layer with the first and second routing lines 131 and 141 and the pad electrodes 135.

Both the connection electrodes 130 and 140 and the first and second routing lines 131 and 141 are formed at the peripheral region. And, a guide ring line 160 is formed on an edge of the peripheral region, i.e., on an outer region of an outermost one of the first and second routing lines 131 and 141, and the guide ring line 160 has a ground voltage signal or a DC voltage signal applied thereto to shield the external static electricity.

There is a transparent conductive layer 150 formed at the peripheral region adjacent to an edge of the active region A/A and connected to the guide ring line 160 from an upper layer or a lower layer.

In this instance, a minimum width of the transparent conductive layer is equal to a straight-line distance from an inside line of innermost one of the first and second routing lines 131 and 141 adjacent to the active region A/A to an outer edge line of the guide ring line 160 which is not adjacent to the first and second routing lines 131 and 141. However, at upper and lower sides of the substrate 100, the widths of the transparent conductive layer 150 can be formed greater at the side the pad electrodes are formed thereon. In this case, a minimum width of the transparent conductive layer 150 is a straight-line distance from an inside line of an innermost one of the first and second routing line 131, 141 to an edge line of the guide ring line 160 which is not adjacent to the first routing lines 131 and the second routing lines 141. The transparent conductive layer 150 has a region falling under the peripheral region excluding the pad electrodes 135. As another example, the transparent conductive layer can be further extended from the edge line of the guide ring line 160, which is not adjacent to the first routing lines and the second routing lines 141, to an outer edge line of the substrate 100, as shown in FIG. 4.

And, the transparent conductive layer 150 is formed to cover, not only the guide ring line 160, but also the first and second routing lines 131 and 141, preferably to entirely cover not only the guide ring line 160 but also the first and second routing lines 131 and 141. Accordingly, the external static electricity can be shielded by the transparent conductive layer 150 at first. Particularly, the ground voltage signal or the DC voltage signal applied to the transparent conductive layer 150 can prevent the external static electricity from affecting the first and second routing lines 131 and 141 which are on an inner region of the transparent conductive layer 150.

And, if the touch panel is attached to the display panel 1000 (See FIG. 10), even if a circuit for driving the display panel is positioned at a portion of the touch panel which overlaps with the first and second routing lines 131 and 141, since a connected structure of the transparent conductive layer 150 and the guide ring line 160 shields an electro-magnetic interference, the touch panel can be driven without malfunction without being affected by the drive of the underlying display panel 1000.

By forming the transparent conductive layer 150 on the same layer with the first electrodes 110 and the second electrodes 120 spaced from one another, the transparent conductive layer 150 can be formed without an increased mask steps.

In the meantime, the transparent conductive layer 150 can be formed under or on the guide ring line 160. In this case, the transparent conductive layer 150 is formed on the same layer, and in the same transparent electrodes, with the first electrode patterns 110a and the second electrode patterns 120a (See FIGS. 7 and 8).

Depending on cases, the transparent conductive layer 150 can includes a first conductive film under the guide ring line 160 and a second conductive film on the guide ring line 160, doubly. In this case, the first conductive film or the second conductive film is formed at the same layer, and in the same transparent electrodes, with the first electrodes (See FIG. 9), and both of the first conductive film and the second conductive film are electrically connected to the guide ring line 160.

The touch panels of the present invention will be described embodiment by embodiment with reference to sections thereof in view of structures and fabricating methods.

Figure 7:
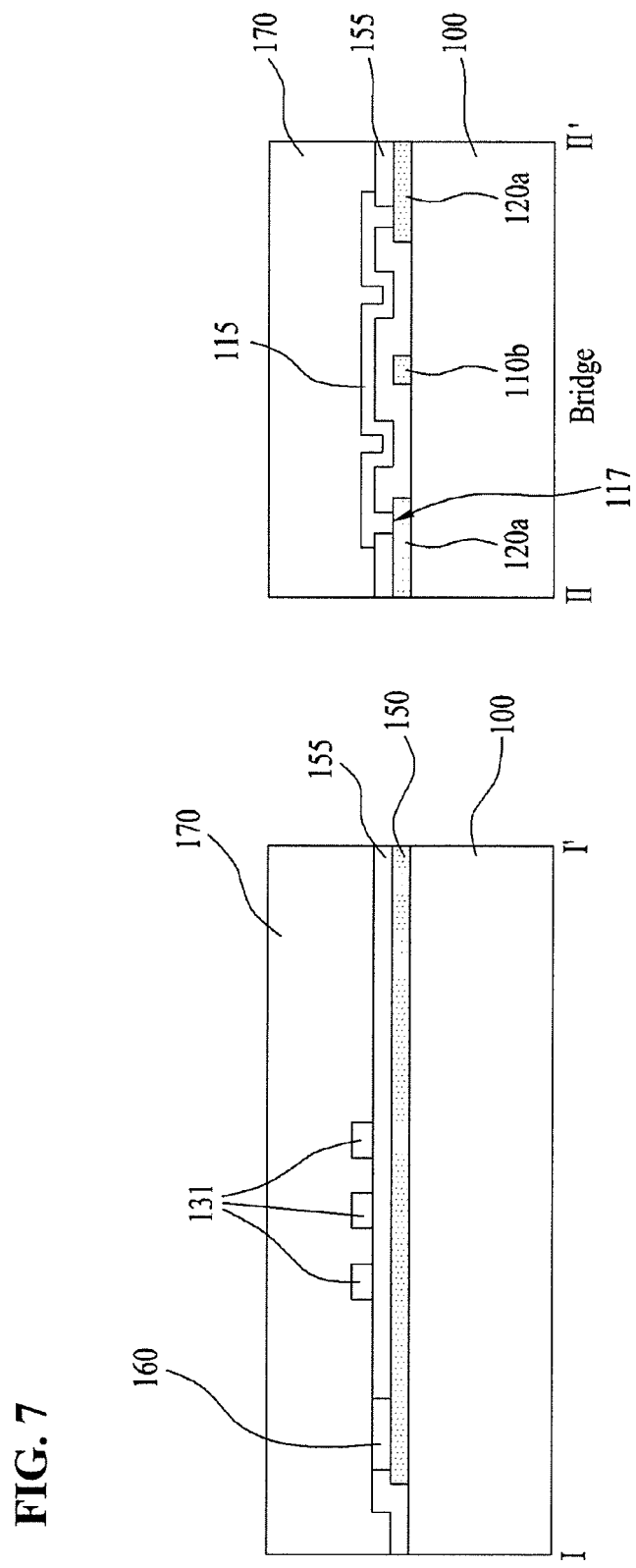
FIG. 7 illustrates sections across lines I-I' and II-II' in FIG. 6 of a touch panel in accordance with a first preferred embodiment of the present invention.

FIG. 7 illustrates sections across lines I-I' and II-II' in FIG. 6 of a touch panel in accordance with a first preferred embodiment of the present invention.

Referring to FIGS. 6 and 7, the touch panel includes first electrode patterns 110a and second electrode patterns 120a formed on an active region of a substrate 100 of transparent electrode components in directions perpendicular to each other. Formed between adjacent first electrode patterns 110a spaced from each other, a first connection pattern 110b is formed for connecting the spaced first electrode patterns 110a as one unit, to form first electrodes 110 each having the first electrode pattern 110a and the first connection pattern 110b. And, at a peripheral region of the touch panel, there is a transparent conductive layer 150 formed of the same component and at the same layer with the first connection patterns 110b and the second electrode patterns 120a to have a fixed width.

Then, the guide ring line 160 is formed on the transparent conductive layer 150 on an inner region of an edge line thereof.

Then, a first insulating film 155 is formed on the substrate 100 including the guide ring line 160, the first electrodes 110 and the second electrode patterns 120a.

Then, metal is deposited on the first insulating film 155, and removed selectively to form first and second routing lines 131 and 141 at the peripheral region over the transparent conductive layer 150. In this case, the first and second routing lines 131 and 141 are positioned on an inner region of the guide ring line 160. And, in the same step, a portion of the first insulating film 155 is removed, to form contact holes 117 which expose the second electrode patterns 120a, and the metal is filled in the contact holes 117, to form a second connection pattern 115 which connects adjacent second electrode patterns 120a, electrically.

In this instance, a connection electrode 130 or 140 (See FIG. 4) can be formed additionally, which is connected to the first or second routing lines 131 or 141 and overlapped with an edge of the first electrode 110 or the second electrode 120. It is preferable that the connection electrodes 130 and 140 are formed on the same layer with the guide ring line 160 and the first and second routing lines 131 and 141 in view of reduction of a mask.

Then, a second insulating film 170 is formed to cover an entire surface of the first insulating film 155 including the second connection patterns 115 and the first and second routing lines 131 and 141.

In this case, at the time the touch panel is attached to the display panel (not shown), the second insulating film 170 is attached opposite to a surface of the display panel to which the touch panel is attached.

In the meantime, on the drawings shown, though it is shown that the guide ring line 160 and the first and second routing lines 131 and 141 are formed on layers different from each other, in order to reduce a mask step, the guide ring line 160 can be formed on the same layer with the first and second routing lines 131 and 141. Such a guide ring line 160 is connected to the pad electrodes 135 formed on the same layer with the guide ring line 160, for having the ground voltage signal or the DC voltage signal applied thereto.

In the meantime, a VA (Viewing Area) on an outer region of the active region A/A is an area which is visible actually, but does not contribute to the touch drive with which ends of the connection electrodes 130 or 140 or the first electrodes 110 or the second electrodes 120 overlap.

In this case, the transparent conductive layer 150 is in direct electric contact with the guide ring line 160 and insulated from the first and second routing lines 131 and 141 owing to the first insulating film 155, electrically. The guide ring line 160 has lower electrical resistance than the transparent conductive layer 150 to shorten discharge delay time of noise. The guide ring line 160 together with the transparent conductive layer 150 are electrically connected to each other, thus serving to rapidly discharge noise, discharged from the transparent conductive layer 150. The guide ring line 160 is formed of a metal having relatively low electrical resistance, such as molybdenum (Mo), copper (Cu), silver (Ag), chromium (Cr), aluminum (Al), aluminum neodymium (AlNd) and molybdenum titanium (MoTi).

Moreover, a connected structure of the outermost guide ring line 160 to the transparent conductive layer 150 shields infiltration of the external static electricity into an inner region of the touch panel, and application of the ground voltage signal or the DC voltage signal to the structure enables the touch drive without electro-magnetic interference with the drive of the display panel even if the display panel is positioned under the touch panel.

Figure 8:
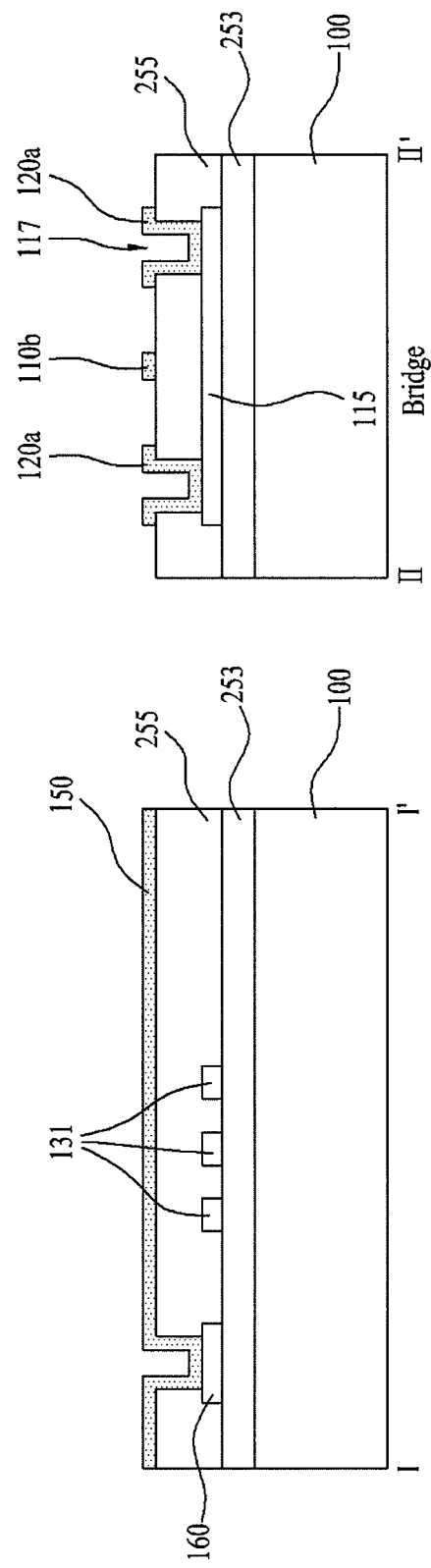
FIG. 8 illustrates sections across lines I-I' and II-II' in FIG. 6 of a touch panel in accordance with a second preferred embodiment of the present invention.

FIG. 8 illustrates sections across lines I-I' and II-II' in FIG. 6 of a touch panel in accordance with a second preferred embodiment of the present invention.

Referring to FIG. 8, the touch panel has a first insulating film 253 formed on a substrate 100 at first. Depending on cases, the first insulating film 253 can be omitted.

A plurality of second connection patterns 115 are formed on the first insulating film 253 at the active region in a longitudinal axis direction spaced from one another. A guide ring line 160 and first and second routing lines 131 and 141 are formed at the peripheral region, the first and second routing lines 131 and 141 are electrically spaced from the guide ring line 160. In this case, the guide ring line 160 can be formed on the substrate 100 before formation of the first insulating film 253.

Then, a second insulating film 255 is formed to cover the guide ring line 160, the first and second routing lines 131 and 141, and the second connection patterns 115, and removed selectively to expose an upper side of the guide ring line 160 and both ends of each of the second connection patterns 115.

Then, a transparent electrode at the peripheral region is patterned to form a transparent conductive layer 150 connected to the guide ring line 160, and an transparent electrode component at the active region is patterned, to form first electrode patterns 110a and second electrode patterns 120a perpendicular to each other and first connection patterns 110b formed as one unit with the first electrode patterns 110a.

Figure 9:
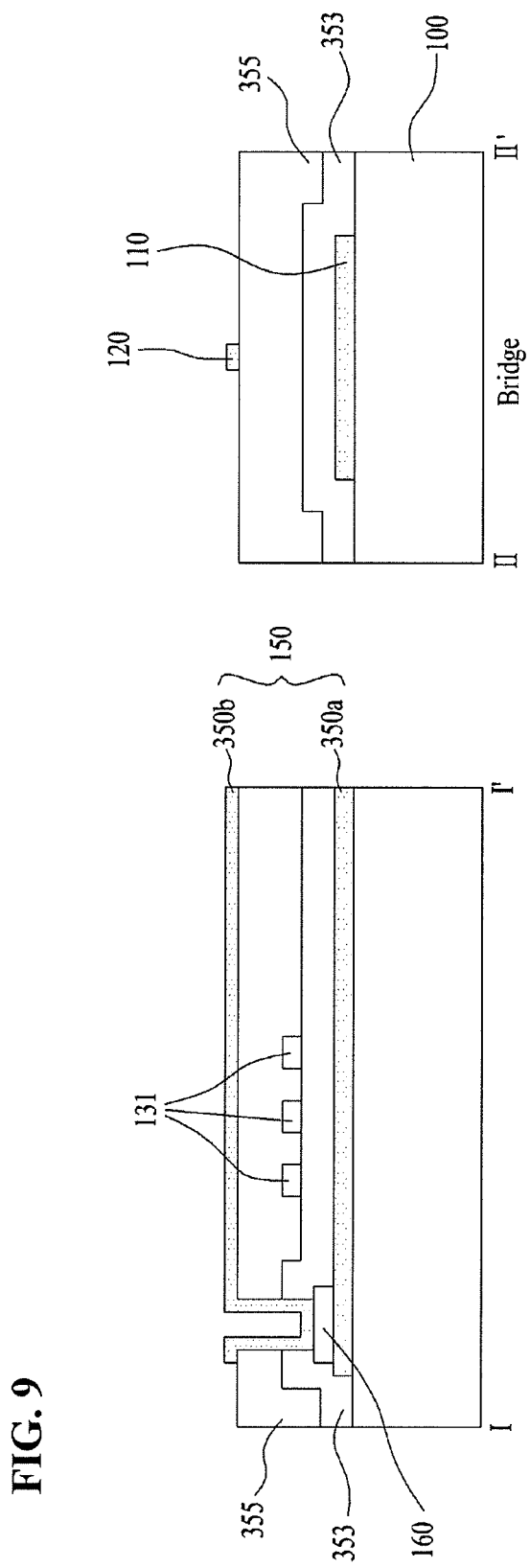
FIG. 9 illustrates sections across lines I-I' and II-II' in FIG. 6 of a touch panel in accordance with a third preferred embodiment of the present invention.

FIG. 9 illustrates sections across lines I-I' and II-II' in FIG. 6 of a touch panel in accordance with a third preferred embodiment of the present invention.

Referring to FIG. 9, different from the first embodiment, the touch panel has double transparent conductive layers 150 formed over and under the guide ring line 160, respectively.

The transparent conductive layer 150 includes a first transparent conductive layer 350a positioned under the guide ring line 160, and a second transparent conductive layer 350b over the guide ring line 160 in contact with the guide ring line 160 through contact holes formed through the second insulating film 355 and the first insulating film 353 by removing predetermined portions of the second insulating film 355 and the first insulating film 353.

In this instance, the first electrodes 110 and the second electrodes 120 can also be formed on layers different from each other respectively and matched to the first and second transparent conductive layers 350a and 350b to form each of the electrodes as one unit without providing additional connection patterns. Depending on cases, as described before, the first electrodes 110 and the second electrodes 120 can be formed on the first transparent conductive layer 350a or the second transparent conductive layer 350b at a time, with a bridge structure (A second connection pattern at a layer different from the second electrode) described in the first or second embodiment formed at each crossed portion of the first electrodes 110 and the second electrodes 120 for preventing short taking place at the crossed portions.

In the third embodiment, since the transparent conductive layer 150 shields the periphery of the touch panel doubly, enabling secure prevention of infiltration of the external static electricity and secure shielding of the electro-magnetic interference from the underlying display panel.

Figure 10:
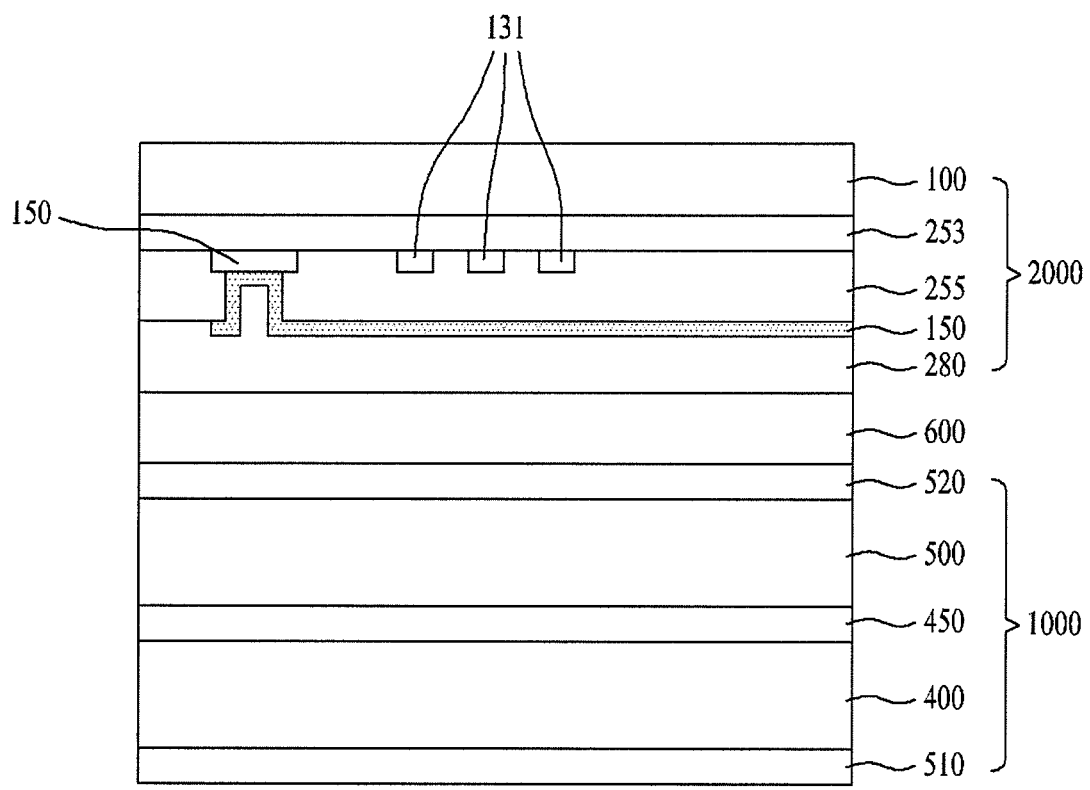
FIG. 10 illustrates a section of display panel having an embedded touch panel of the present invention applied thereto, in which the touch panel of the present invention is applied to a liquid crystal panel.

FIG. 10 illustrates a section of a display panel having an embedded touch panel of the present invention applied thereto, in which the touch panel of the present invention is applied to a liquid crystal panel.

Referring to FIG. 10, the display panel having an embedded touch panel shows an example in which the touch panel in the second preferred embodiment is applied to a liquid crystal panel 1000, with the touch panel overturned.

The liquid crystal panel 1000 includes first and second substrates 400 and 500 opposite to each other, a liquid crystal layer 450 filled between the first and second substrates 400 and 500, and first and second polarizing plates 510 and 520 attached to outer surfaces of the first and second substrates 400 and 500, respectively.

The liquid crystal panel 1000 is an example of the display panel. Besides the liquid crystal panel 1000, the display panel can be any flat display panel, such as an organic light emitting display panel, a plasma display panel, an electrophoresis display panel, and a field emission display panel.

Then, the liquid crystal panel 1000 is bonded to the touch panel 2000 with an adhesive layer 600 disposed therebetween. The adhesive layer 600 is disposed between a protective film 280 which covers the transparent conductive layer 150 of the touch panel 2000 and the second polarizing plate 520 of the liquid crystal panel 1000. The protective film 280 can be omitted.

If the touch panel 2000 is placed on a substrate of the liquid crystal panel 1000 without being over turned thus, a cover glass (not shown) can be provided on the touch panel 2000 additionally for protecting the upper surface of the touch panel 2000.

In the meantime, formed on the first substrate 400 of the liquid crystal panel 1000, there are gate lines and data lines crossed with each other to define pixel regions, a thin film transistor (TFT) formed at every crossed portion of the gate lines and the data lines, a thin film transistor array having pixel electrodes formed thereon formed at the pixel region.

And, formed on the second substrate 500, there are a black matrix layer, a color filter layer, and a common electrode (not shown, Vcom (applied voltage)).

In the meantime, though above embodiments show diamond shaped first electrode patterns 110*a* and second electrode patterns 110*b* of the first electrodes and the second electrodes, the shape is not limited to this, but the shape can be changed, such as a square different from the diamond shape or a polygon different from the diamond shape. Depending on cases, the first electrodes and the second electrodes can have bar shapes without forming the connection patterns, additionally.

And, at the time of formation of the touch panel, the first and second insulating films are formed to expose the pad electrodes, and the pad electrodes are connected to an external FPC for having a control signal applied thereto from an external system.

As has been described, the touch panel of the present invention has the following advantages.

The guide ring line formed on an outer region of the routing lines at the peripheral region and the transparent conductive layer formed at the peripheral region to cover the guide ring line and the routing lines can prevent the external static electricity from infiltrating into the touch panel.

And, the connection of the guide ring line to the transparent conductive layer and the application of the ground signal or the constant voltage to the guide ring line permits secure drive of the touch panel without affected from the drive of the underlying display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch panel comprising:
    a substrate having an active region and a peripheral region surrounding the active region;
    a plurality of first electrodes and second electrodes formed on the active region in a row direction and a column direction, respectively;
    a plurality of pad electrodes on one side of the peripheral region;
    routing lines for connecting ends of the first electrodes and the second electrodes to the pad electrodes, respectively;
    a first insulating film formed between the substrate and the routing lines;
    a guide ring line formed on the first insulating film and on an outer region of the routing lines;
    a second insulating film formed over the guide ring line and the routing lines; and
    a transparent conductive layer including first and second conductive films formed of indium tin oxide (ITO), the first conductive film formed above the substrate and formed under both the first insulating film and the guide ring line, the first conductive film being directly connected to the guide ring line, the second conductive film formed over the guide ring line and the first insulating film at the peripheral region to cover the routing lines, the second conductive film being directly connected to the guide ring line to have an electrical connection with the guide ring line,
    wherein the transparent conductive layer has a region falling under the peripheral region.

2. The touch panel as claimed in claim 1, wherein a minimum width of the transparent conductive layer is equal to a straight-line distance from an inside line of an innermost routing line adjacent to the active region to an outer edge line of the guide ring line which is not adjacent to the routing line.

3. The touch panel as claimed in claim 1, wherein the first electrodes and the second electrodes are electrically spaced from the transparent conductive layer.

4. The touch panel as claimed in claim 1, wherein the guide ring line has a ground voltage signal or a DC voltage signal applied thereto.

5. The touch panel as claimed in claim 1, wherein each of the first electrodes includes a plurality of first electrode patterns in a first direction spaced from one another, and first connection patterns each electrically connected between adjacent first electrode patterns, and
    each of the second electrodes includes a plurality of second electrode patterns in a second direction perpendicular to the first direction spaced from one another, and second connection patterns each electrically connected between adjacent second electrode patterns,
    wherein the second connection patterns and the second electrode patterns are formed in different layers.

6. The touch panel as claimed in claim 5, wherein the second connection patterns are formed on the same layer with the routing lines and the pad electrodes.

7. The touch panel as claimed in claim 6, further comprising connection electrodes electrically connected between ends of the first electrodes and the second electrodes, and the routing lines, respectively.

8. The touch panel as claimed in claim 7, wherein the connection electrodes are formed on the same layer with the routing lines and the pad electrodes.

9. The touch panel as claimed in claim 1, wherein a surface of the substrate, on which the first electrodes and the second electrodes are formed, is attached to a surface of the display panel.

10. The touch panel as claimed in claim 1, wherein a first surface of the substrate, on which the first electrodes and the second electrodes are not formed, is attached to a surface of the display panel.

11. The touch panel as claimed in claim 10, further comprising a cover glass attached to a second surface of the substrate, on which the first electrodes and the second electrodes are formed.

12. A touch panel comprising:
    a substrate having an active region and a peripheral region surrounding the active region;
    a plurality of first electrodes and second electrodes formed on the active region in a row direction and a column direction, respectively;
    a plurality of pad electrodes on one side of the peripheral region;
    routing lines for connecting ends of the first electrodes and the second electrodes to the pad electrodes, respectively;
    a first insulating film formed between the substrate and the routing lines;
    a guide ring line formed on the first insulating film and on an outer region of the routing lines;
    a second insulating film formed over the guide ring line and the routing lines; and
    a transparent conductive layer including first and second conductive films formed of indium tin oxide (ITO), the first conductive film formed above the substrate and formed under both the first insulating film and the guide ring line, the first conductive film being directly connected to the guide ring line, the second conductive film formed over the guide ring line and the first insulating film at the peripheral region to cover the routing lines, the second conductive film being directly connected to the guide ring line to have an electrical connection with the guide ring line, wherein the transparent conductive layer has a region falling under the peripheral region, wherein a minimum width of the transparent conductive layer is equal to a straight-line distance from an inside line of innermost routing line adjacent to the active region to an outer edge line of the guide ring line which is not adjacent to the routing line, and wherein the first electrodes and the second electrodes are electrically spaced from the transparent conductive layer.

* * * * *